United States Patent [19]
Debelleix et al.

[11] Patent Number: 5,532,463
[45] Date of Patent: Jul. 2, 1996

[54] PROCESS FOR MAKING SECURE THE WRITING OF SENSITIVE DATA INTO THE EEPROM DATA STORAGE MEMORY OF A MEMORY CARD AND A MEMORY CARD FOR USE IN THE PROCESS

[75] Inventors: Olivier M. Debelleix; Fabien P. Thiriet, both of Orleans, France

[73] Assignee: Solaic (Societe Anonyme), Puteaux, France

[21] Appl. No.: 249,239

[22] Filed: May 25, 1994

[30] Foreign Application Priority Data

May 26, 1993 [FR] France ................................ 93 06287

[51] Int. Cl.$^6$ ................................................ G06K 05/00
[52] U.S. Cl. ............................................ 235/380; 395/200
[58] Field of Search ........................... 35/380, 375, 492; 395/200

[56] References Cited

U.S. PATENT DOCUMENTS

| 4,827,115 | 5/1989 | Uchida et al. | 235/380 |
| 5,214,774 | 5/1993 | Welsch et al. | 395/200 |

FOREIGN PATENT DOCUMENTS

| 0232926 | 9/1988 | European Pat. Off. | 235/380 |
| 0398545 | 11/1990 | European Pat. Off. | 235/380 |
| WO89/10618 | 11/1989 | WIPO | 235/380 |
| WO92/04716 | 3/1992 | WIPO | 235/380 |

*Primary Examiner*—Donald T. Hajec
*Assistant Examiner*—Thien Minh Le
*Attorney, Agent, or Firm*—Finnegan, Henderson, Farabow, Garrett and Dunner

[57] ABSTRACT

Process and memory card (1) for making secure the writing of sensitive data into the EEPROM data storage memory (2) of the card, consisting, during each write, in performing the following operations in succession:

a) registering the start address of the data area (Ze) of the card to which a write is to be performed, into an address field (Za) of the memory);

b) reading the data present in this data area (Ze) of the memory;

c) storing the read data in a save area (Zs) of the memory;

d) writing the "WRITE IN PROGRESS" datum into a flag area (Zd) of the memory;

e) performing the write to the data area (Ze) of the memory; and f) writing the "NO WRITE IN PROGRESS" datum into the flag area (Zd) of the memory.

4 Claims, 1 Drawing Sheet

PROCESS FOR MAKING SECURE THE WRITING OF SENSITIVE DATA INTO THE EEPROM DATA STORAGE MEMORY OF A MEMORY CARD AND A MEMORY CARD FOR USE IN THE PROCESS

BACKGROUND OF THE INVENTION

1. Field of the Invention

The present invention relates to a process for making secure the writing of sensitive data into the EEPROM data storage memory of a memory card, and, to a memory card or microchip card for the implementation of said process.

2. Description of the Related Art

In a memory card, especially of the electronic-cash type, that is to say containing information of a financial nature, a reserve of money, a credit, or in a card containing any confidential information, one of the main problems is to guarantee the integrity of the data present in memory, following an untimely wrenching out of the card, a fault in the supply to the processing terminal, or a program failure.

Thus, in the event of a problem as exemplified above, it is not known what becomes of the data present in memory, nor which data have been correctly updated or confirmed; the data may then take values which are erroneous, random or disproportionate as compared with the actual values.

For example, the amount of the available credit registered on a payment card or that figuring on a restaurant access card could be cancelled out or modified following an untimely wrenching out or a failure.

However, the invention also pertains to any microchip card containing a confidential or sensitive item of information or datum capable of being corrupted, altered or modified through clumsy or untimely handling, a programing error or a failure affecting its physical or logical modules.

Thus, one of the main objects of the invention is to recover the sensitive data or information items and restore them to the reliable state which they were in before the incident occurred and, to do this, the process is characterized in that it consists, during each write, in performing the following operations in succession:

a) registering the start address of the data area of the card to which a write is to be performed into an address field of the memory;

b) reading the data present in this data area of the memory;

c) storing the read data in a save area of the memory;

d) writing the "WRITE IN PROGRESS" datum into a flag area of the memory;

e) performing the write to the data area of the a memory; and f) writing the "NO WRITE IN PROGRESS" datum into the flag area of the memory.

This makes it possible to save a copy of the initial data before any modification or updating, whilst retaining and updating the information item upon the occurrence or the absence of difficulty during processing.

Advantageously, the process according to the invention consists, during each powering-up of the microchip card, in performing the following operations:

a) reading the "FLAG" datum in the flag area of the memory and normally continuing the program for operating the card in the event that this datum is equal to "NO WRITE IN PROGRESS", and b) if the "FLAG" datum is equal to "WRITE IN PROGRESS":

copying the data stored in the save area of the memory into the data area, beginning with the address specified in the address field, then writing the "NO WRITE IN PROGRESS" datum into the flag area of the memory.

Thus, in the event of difficulty, for example caused by a disruption in the execution of the process, the initial situation is restored, and in the event of the absence of difficulty, the program carries on normally.

The process according to the invention can advantageously be implemented in a memory card and, in this case, there are provided, in the EEPROM data storage memory (non-volatile, erasable and reusable memory):

a data area for performing writes thereto, an address field for registering therein the start address for the said writes, a save area for temporarily storing therein already-written data, a flag area for writing thereto the "WRITE IN PROGRESS" datum or the "NO WRITE IN PROGRESS" datum.

Thus, the microchip card retains a copy of the sensitive data and, during each write of the said sensitive data or during each powering-up, the data are restored to their initial state if the program reveals that an anomaly has occurred, such as an untimely wrenching out, a drop or stoppage in voltage, or any event likely to adversely affect the security of the processing or of the sensitive data concerned.

BRIEF DESCRIPTION OF THE DRAWINGS

The single FIGURE represent a schematic view of a memory card as well as the various interventions on the memories of the card and the various steps of the process in accordance with the present invention.

DESCRIPTION OF THE PREFERRED EMBODIMENT

Figure 1:
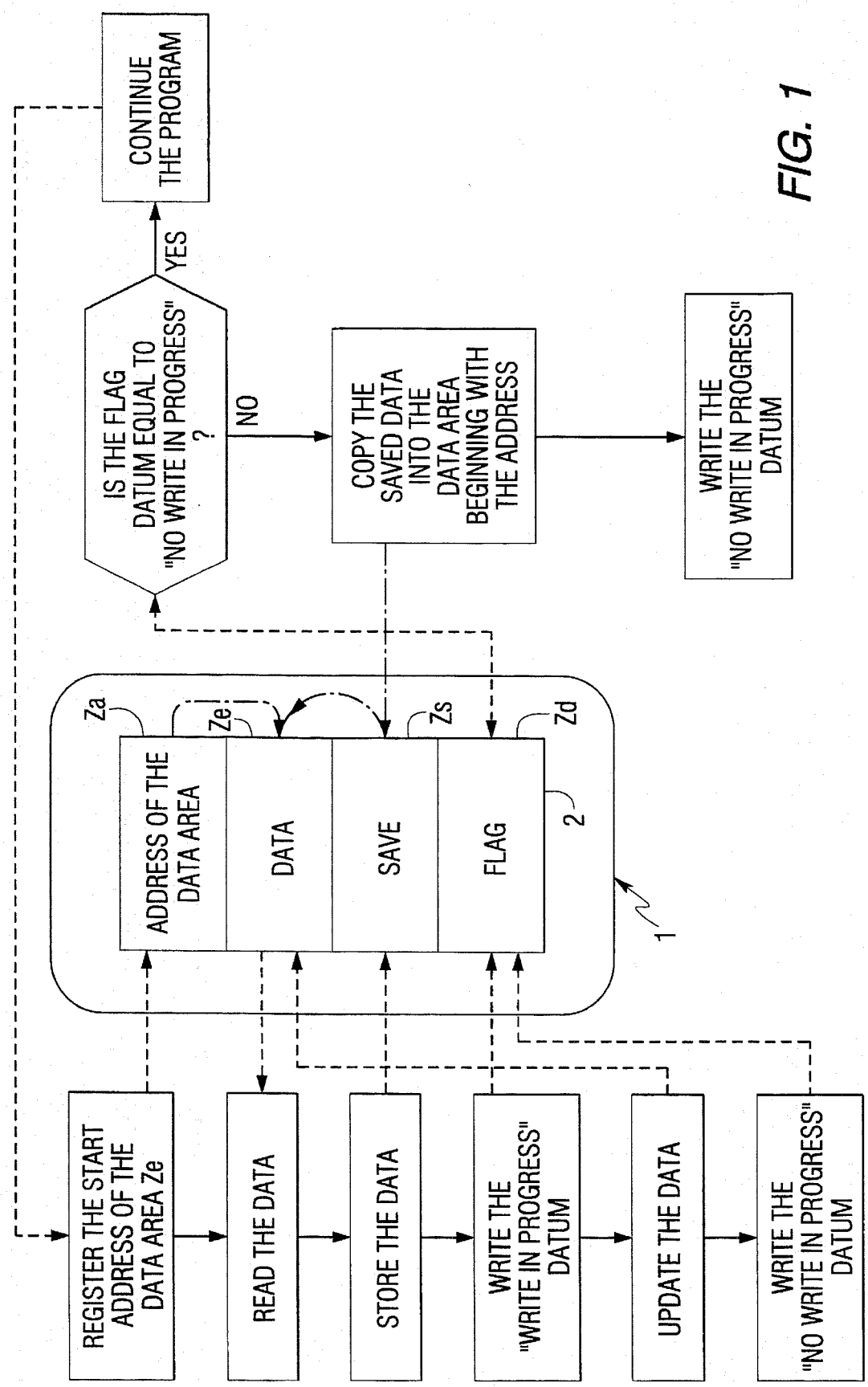

In the non-limiting example represented in the drawing, in connection with which the invention will be described, reference 1 represents a memory card used in a company restaurant equipped with a card payment system. The users of the card have a microchip card furnished with an EEPROM memory 2 which contains a value representing a sum of money and they can reload their card as they see fit, by slipping it into a reader and by indicating a secret code. The sum of money loaded into the card will be automatically debited by the computer charged with calculating the salaries of the staff of the company. To pay for a meal, the user of the restaurant goes to a cashier who records the items consumed; the user slips his card into a reader present near the cash till, then indicates his secret code. At this moment, the sum of money notionally contained in the card is debited directly with the price of the meal. If the user withdraws his the meal is being performed, the value registered in the card could be anything, depending on the moment, in the write sequence, at which the card was withdrawn; this could be a zero value or any other value less than or greater than the correct value.

In short, the card does not have the level of security demanded for this type of application.

By contrast, the microchip card according to the present invention allows these drawbacks to be remedied and includes, to this end, in the EEPROM data storage memory 2, at least four memory areas:

a data area Ze for performing writes thereto, an address field Za for registering therein the start address for the said writes, a save area Zs for temporarily storing therein already-written data, a flag area Zd for writing thereto the "WRITE IN PROGRESS" datum or the "NO WRITE IN PROGRESS" datum.

A "FLAG" datum is present in the area Zd.

Thus when the user of the company restaurant places his card into the reader, the operations described below are performed, after reading the "FLAG" datum in the area Zd.

In the event that the value of the "FLAG" datum is equal to "NO WRITE IN PROGRESS", the program for operating the card can continue, in particular the updating of the balance available for future meals, according to the following process:

the start address of the data area of the card to which a write is to be performed is registered into the address field Za;

the data present in the data area Ze are read and are stored in the save area Zs;

the "WRITE IN PROGRESS" datum is written into the flag area Zd;

the write for updating the card is performed in the area Ze; and the "NO WRITE IN PROGRESS" datum is written into the flag area Zd of the memory.

When the updating of the card is completed, the user withdraws it from the reader.

However if, either in the course of a previous use of the card, or in the course of the process described above, following for example a break in current or an untimely withdrawal of the card from the reader, the "NO WRITE IN PROGRESS" datum has not replaced, in the area Zd, the previous "WRITE IN PROGRESS" value, and the "FLAG" datum is equal to "WRITE IN PROGRESS".

Under this assumption, there is no assurance that the data Zd are right, and since the value of the "FLAG" datum is equal to "WRITE IN PROGRESS", the process then implemented includes the following steps:

the data stored in the save area Zs are copied into the data area Ze, beginning with the address specified in the the "NO WRITE IN PROGRESS" datum is written into the flag area Zd of the memory.

It is therefore seen that, should an untimely event occur in the course of the data updating cycle, these data are not reliable and so are replaced with the data previously saved in Zs.

The user can then employ his card to settle up for his meal, following which the "flag" datum of the memory area Zd ought to reassume the normal value "NO WRITE IN PROGRESS".

This example has been described by way of non-limiting illustration of the memory card and of the process according to the invention.

In conclusion, through the use of a memory card and the process as described, the invention makes it possible to remedy the problems caused by various malfunctions in the field of the security of memory cards, such as wrenching out, break in current and the like.

We claim:

1. A process for making secure the writing of sensitive data into an EEPROM data storage memory of a memory card having a data area, an address field, a save area, and a flag area, comprising, performing, during each write operation, in succession the steps of:

a) registering a start address of the data area of the card to which writing is to be performed, into the address field of the memory;

b) reading the data present in the data area of the memory;

c) storing the read data in the save area of the memory;

d) writing "WRITE IN PROGRESS" datum into the flag area of the memory;

e) writing to the data area of the memory; and (f) writing "NO WRITE IN PROGRESS" datum into the flag area of the memory, and wherein the contents of the flag area Zd is being overwritten by the "WRITE IN PROGRESS" datum or the "NO WRITE IN PROGRESS" datum.

2. A process according to claim 1, further comprising, during each powering-up of the memory card, the steps of:

a) reading "FLAG" datum in the flag area of the memory, continuing the steps of operating the card when the read data is equal to "NO WRITE IN PROGRESS", and b) copying the data stored in the save area of the memory into the data area, beginning with the address specified in the address field when the "FLAG" datum is equal to "WRITE IN PROGRESS", and writing the "NO WRITE IN PROGRESS" datum into the flag area of the memory following the step of copying the data.

3. A memory card for the implementation of a process for making secure the writing of sensitive data, comprising:

an EEPROM data storage memory, said EEPROM data storage memory including, a data area for writing data therein, an address field for registering therein a start address of the data area for reading data in the EEPROM to which the writing is to be performed, a save area for temporarily storing therein data written in the data area, and a flag area for writing therein "WRITE IN PROGRESS" datum or "NO WRITE IN PROGRESS" datum the contents of the flag area is being overwritten by the "WRITE IN PROGRESS" datum or the "NO WRITE IN PROGRESS" datum.

4. A memory card according to claim 3, further comprising:

means for reading "FLAG" datum in the flag area of the memory, means for continuing normal operation of the EEPROM when the read FLAG datum is equal to "NO WRITE IN PROGRESS", and means for copying the data stored in the save area of the memory into the data area, beginning with the address specified in the address field when the "FLAG" datum is equal to "WRITE IN PROGRESS", and means for writing the "NO WRITE IN PROGRESS" datum into the flag area of the memory following the copying off the data.

* * * * *

UNITED STATES PATENT AND TRADEMARK OFFICE
CERTIFICATE OF CORRECTION

PATENT NO. : 5,532,463
DATED : July 2, 1996
INVENTOR(S) : DEBELLEIX ET AL.

It is certified that error appears in the above-indentified patent and that said Letters Patent is hereby corrected as shown below:

Abstract, front page, line 7, after "memory" delete --)--.

Claim 3, column 4, line 45, after "datum" (second occurrence) insert --;--.

Claim 4, column 4, line 55, change "read FLAG" to --"FLAG"--.

Signed and Sealed this

First Day of April, 1997

BRUCE LEHMAN

Attest:

Attesting Officer

Commissioner of Patents and Trademarks